(12) United States Patent
Kim et al.

(10) Patent No.: US 11,662,852 B2
(45) Date of Patent: May 30, 2023

(54) DISPLAY DEVICE AND DRIVING METHOD THEREOF

(71) Applicant: SAMSUNG DISPLAY CO., LTD., Yongin-si (KR)

(72) Inventors: Min Soo Kim, Yongin-si (KR); Dong Ho Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/739,388

(22) Filed: May 9, 2022

(65) Prior Publication Data

US 2023/0074089 A1   Mar. 9, 2023

(30) Foreign Application Priority Data

Sep. 8, 2021 (KR) .................... 10-2021-0119900

(51) Int. Cl.
*G06F 3/041* (2006.01)
*G06F 3/044* (2006.01)

(52) U.S. Cl.
CPC ........ *G06F 3/04162* (2019.05); *G06F 3/0412* (2013.01); *G06F 3/0446* (2019.05); *G06F 2203/04102* (2013.01)

(58) Field of Classification Search
CPC .. G06F 3/04162; G06F 3/0446; G06F 3/0412; G06F 2203/04102
See application file for complete search history.

(56) References Cited

U.S. PATENT DOCUMENTS

| | | | |
|---|---|---|---|
| 8,237,983 B2 | 8/2012 | Yoshida | |
| 9,857,832 B2 | 1/2018 | Kim et al. | |
| 11,009,913 B2* | 5/2021 | Hirakata | G06F 3/0412 |
| 2014/0320479 A1* | 10/2014 | Kaneko | G09G 3/3648 |
| | | | 345/212 |
| 2016/0111055 A1* | 4/2016 | Na | G09G 3/3666 |
| | | | 345/94 |
| 2016/0357221 A1* | 12/2016 | Huh | G06F 3/0346 |
| 2021/0027720 A1 | 1/2021 | Park et al. | |

FOREIGN PATENT DOCUMENTS

| | | |
|---|---|---|
| KR | 10-0906457 | 7/2009 |
| KR | 10-2016-0143115 | 12/2016 |
| KR | 10-2110975 | 6/2020 |
| KR | 10-2020-0119143 | 10/2020 |
| KR | 10-2021-0013475 | 2/2021 |

\* cited by examiner

*Primary Examiner* — Lisa S Landis
(74) *Attorney, Agent, or Firm* — F. Chau & Associates, LLC

(57) ABSTRACT

A display device includes a display panel including a display area having first and second areas for displaying an image. The display panel is positioned in first and second states. A sensing panel is disposed on the display panel and includes sensing electrodes. A panel driver drives the display panel. A sensor driver drives the sensing panel. The panel driver drives the first and second areas at a first driving frequency when the display panel is in a first state and drives the first area at the first driving frequency and drives the second area at a second driving frequency lower than the first driving frequency when the display panel is in the second state. The sensor driver drives the first and second areas in a sequence that includes the first and second sensing modes each for a predetermined time, when the display panel is in the first state.

20 Claims, 10 Drawing Sheets

DISPLAY DEVICE AND DRIVING METHOD THEREOF

CROSS-REFERENCE TO RELATED APPLICATION

This application claims priority under 35 U.S.C. § 119 to Korean Patent Application No. 10-2021-0119900, filed on Sep. 8, 2021 in the Korean Intellectual Property Office, the disclosure of which is incorporated by reference in its entirety herein.

1. TECHNICAL FIELD

The present disclosure relates to a display device and a driving method thereof.

2. DISCUSSION OF RELATED ART

Display devices have become increasingly popular as the demand for a portable information medium has increased.

Recently, a foldable display device, a bendable display device, a rollable display device, and the like have been developed using a flexible display panel that may be bent or folded. Such display devices may be applied to electronic devices, such as a television and a monitor, as well as a portable electronic devices and wearable devices in various different fields.

A display device may include a touch sensor for an input device, in addition to a keyboard or a mouse. When a user presses or touches a display screen with a finger or a pen, the touch sensor detects a signal generation position due to contact occurrence or electrical capacitance change, and transmits the position to various controllers.

SUMMARY

The present disclosure has been made in an effort to provide a display device that has a different driving method depending on a state of a display panel and a driving method thereof.

According to an embodiment of the present disclosure, a display device includes a display panel including a display area having a first area and a second area for displaying an image. The display panel is configured to be positioned in a first state and a second state that is different from the first state. A sensing panel is disposed on the display panel and including sensing electrodes. A panel driver drives the display panel. A sensor driver drives the sensing panel. The sensor driver is configured to drive the sensing panel in a first sensing mode and a second sensing mode that is different from the first sensing mode. The panel driver drives the first area and the second area with a first driving frequency, when the display panel is in the first state. The panel driver drives the first area with the first driving frequency, and drives the second area with a second driving frequency that is lower than the first driving frequency, when the display panel is in the second state. The sensor driver drives the first area and the second area in a sensing driving sequence that includes the first sensing mode and the second sensing mode each for a predetermined time, when the display panel is in the first state.

The first state may be a state in which the first area and the second area are positioned on a same plane, and the second state may be a state in which the first area and the second area face each other at an angle of less than 180 degrees.

In an embodiment, when the display panel is in the first state, the first area and the second area may display at least one moving image.

In an embodiment, when the display panel is in the second state, the first area may display at least one moving image and the second area may display at least one still image.

In an embodiment, the display panel may further includes a third area that is configured to be bent along a folding line that is positioned between the first area and the second area, and at least a portion of the third area may display the at least one moving image.

In an embodiment, the first sensing mode may be a sensing mode corresponding to a user's finger input, and the second sensing mode may be a sensing mode corresponding to an electronic pen input.

In an embodiment, the sensor driver drives the first area, the second area, and the third area in a sensing driving sequence that includes the first sensing mode and the second sensing mode each for a predetermined time, when the display panel is in the first state.

In an embodiment, when the display panel is in the second state, the sensor driver may drive the first area and a first portion of the third area in a sensing driving sequence that includes the first sensing mode and the second sensing mode each for a predetermined time and drives a second portion of the third area and the second area in the first sensing mode.

In an embodiment, when the display panel is in the second state, the sensor driver may drive the first area in a sensing driving sequence that includes the first sensing mode and the second sensing mode each for a predetermined time and may drive the second area in the first sensing mode.

In an embodiment, when the display panel is in the second state, the sensor driver may drive the first area in a sensing driving sequence that includes the first sensing mode and the second sensing mode each for a predetermined time and may drive the second area in a sensing driving sequence that includes the first sensing mode and the second sensing mode each for a predetermined time.

According to an embodiment of the present disclosure, a driving method of a display device that includes a display panel including a display area having a first area, a second area, and a third area for displaying an image, the third area is configured to be bent along a folding line positioned between the first area and the second area. The display panel is configured to be positioned in a first state and a second state that is different from the first state based on bending of the third area. A panel driver drives the display panel. A sensing panel includes sensing electrodes. A sensor driver drives the sensing panel. The sensor driver is configured to drive the sensing panel in a first sensing mode and a second sensing mode that is different from the first sensing mode. The driving method includes driving the first area and the second area with a first driving frequency by the panel driver, when the display panel is in the first state. The first area is driven with the first driving frequency and the second area is driven with a second driving frequency lower than the first driving frequency by the panel driver, when the display panel is in a second state different from the first state. The first area, second area and third area are driven in a sensing driving sequence that includes the first sensing mode and the second sensing mode each for a predetermined time by the sensor driver when the display panel is in the first state.

In an embodiment, the first area and the second area are driven to display at least one moving image by the panel driver, when the display panel is in the first state.

In an embodiment, the first area is driven to display at least one moving image and the second area is driven to display at least one still image when the display panel is in the second state.

In an embodiment, at least a portion of the third area is driven to display the at least one moving image by the panel driver, when the display panel is in the second state.

In an embodiment, the sensing panel is driven in a sensing mode corresponding to a user's finger input in the first sensing mode by the sensor driver and, the sensing panel is driven in a sensing mode corresponding to an electronic pen input in the second sensing mode by the sensor driver.

In an embodiment, the first area, the second area, and the third area are driven in a sensing driving sequence of the first sensing mode, the second sensing mode, and the first sensing mode by the sensor driver, when the display panel is in the first state.

In an embodiment, the sensing panel is driven in a sensing mode corresponding to an electronic pen input using a digitizer in the second sensing mode by the sensor driver.

In an embodiment, the first area is driven in a sensing driving sequence that includes the first sensing mode and the second sensing mode each for a predetermined time and may drive the second area in the first sensing mode by the sensor driver, when the display panel is in the second state.

In an embodiment, the first area is driven in a sensing driving sequence that includes the first sensing mode and the second sensing mode each for a predetermined time and the second area is driven in a sensing driving sequence that includes the first sensing mode and the second sensing mode each for a predetermined time by the sensor driver, when the display panel is in the second state.

In an embodiment, the first state may be a state in which the first area and the second area are positioned on a same plane, and the second state may be a state in which the first area and the second area face each other at an angle of less than 180 degrees.

According to an embodiment of the present disclosure, since a display device may differently set driving frequencies depending on a state of a display panel, it is possible to prevent unnecessary power consumption.

Effects of embodiments of the present disclosure are not limited by what is illustrated in the above, and more various effects are included in the present specification.

DETAILED DESCRIPTION OF EMBODIMENTS

Since the present disclosure may be variously modified and have various forms, non-limiting embodiments will be illustrated and described in detail in the following description. However, embodiments of the present disclosure are not limited thereto.

Terms such as first, second, and the like will be used only to describe various constituent elements, and are not to be interpreted as limiting these constituent elements. The terms are only used to differentiate one constituent element from other constituent elements. For example, a first constituent element could be termed a second constituent element, and similarly, a second constituent element could be termed as a first constituent element, without departing from the scope of the present disclosure. Singular forms are intended to include plural forms unless the context clearly indicates otherwise.

In the present application, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. It will be understood that when an element such as a layer, film, region, area, or substrate is referred to as being "on" another element, it can be directly on the other element or intervening elements may also be present. In contrast, when an element such as a layer, film, region, area, or substrate is referred to as being "directly on" another element, no other element or intervening elements may be present. In addition, in the present specification, when a portion of a layer, film, region, area, plate, or the like is referred to as being formed "on" another portion, the formed direction is not limited to an upper direction but includes a lateral or lower direction. In contrast, when an element of a layer, film, region, area, plate, or the like is referred to as being "below" another element, it may be directly below the other element, or intervening elements may be present.

Hereinafter, a display device according to an embodiment of the present disclosure will be described with reference to drawings.

Figure 1:
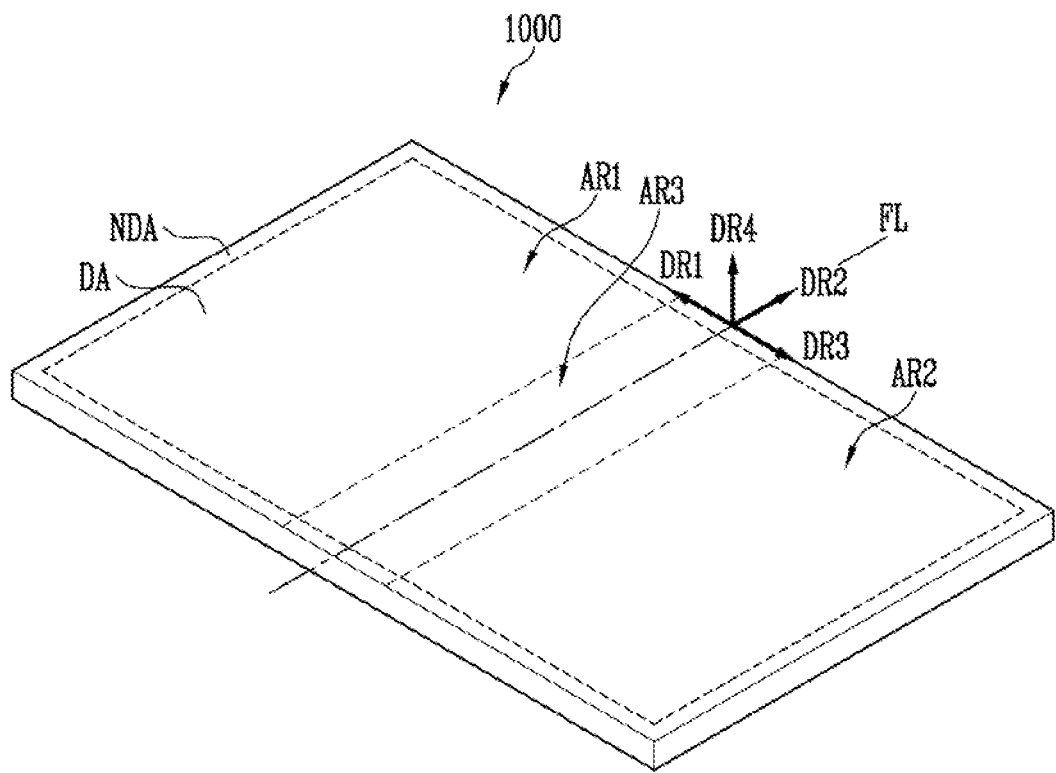
FIG. 1 and FIG. 2 illustrate perspective views of a display device according to embodiments of the present disclosure.
Figure 2:
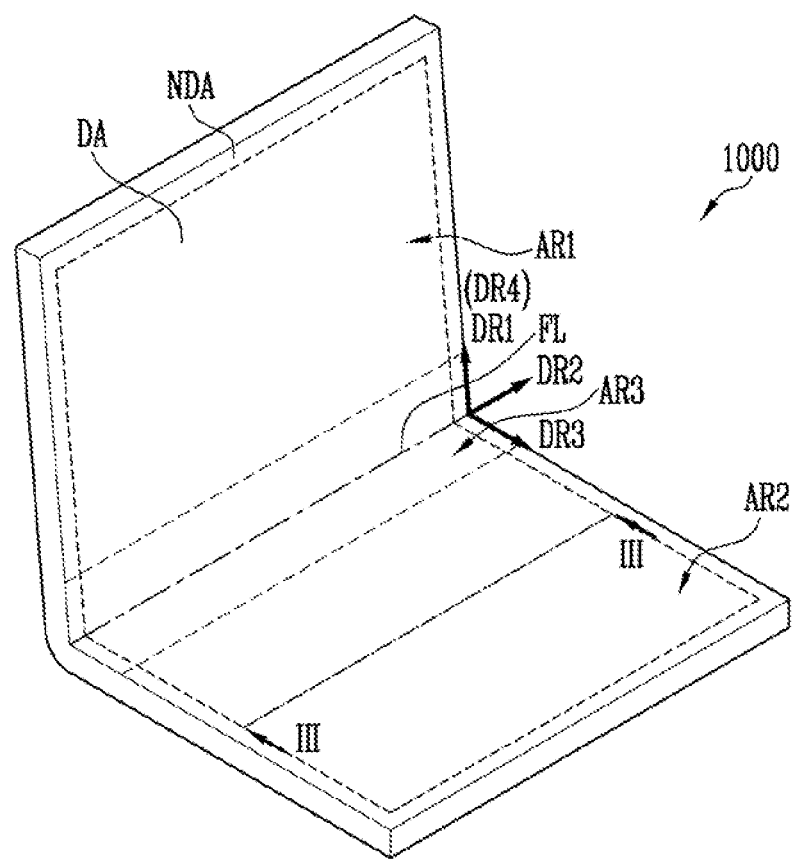

FIG. 1 and FIG. 2 illustrate perspective views of a display device according to an embodiment. The display device according to an embodiment may be a foldable display device.

FIG. 1 illustrates a state in which the display device according to an embodiment is unfolded, and FIG. 2 illustrates a state in which the display device according to an embodiment is folded. Here, FIG. 1 may be defined as showing a first state of the display device, and FIG. 2 may be defined as showing a second state of the display device.

Referring to FIG. 1 and FIG. 2, a display device 1000 according to an embodiment may include a display area DA displaying an image and a non-display area NDA surrounding the display area DA.

The display area DA is an area in which pixels are disposed. The display device 1000 may display an image in the display area DA by driving pixels in response to image data inputted from an external source.

The display area DA may include a first area AR1, a second area AR2, and a third area AR3 which each respectively display an image.

The first area AR1 may be positioned in a first direction DR1 with respect to the third area AR3. The second area AR2 may be positioned in a third direction DR3 with respect to the third area AR3. In an embodiment, the first direction DR1 and a second direction DR2 may be orthogonal to each other, and the second direction DR2 and the third direction DR3 may be orthogonal to each other. In addition, a fourth direction DR4 may be a thickness direction of the display device 1000 that is orthogonal to each of the first direction DR1, the second direction DR2, and the third direction DR3. An angle between the first direction DR1 and the third direction DR3 shown in FIG. 1 may be 180 degrees. In an embodiment, when the display device 1000 is in the first state, the first area AR1 and the second area AR2 may be positioned on the same plane. For example, the first area AR1 and the second area AR2 may be positioned on the same plane in a plane extending in the first direction DR1 and the second direction DR2.

In an embodiment, the display device 1000 may be folded along a folding line FL extending in the second direction DR2 and positioned between the first area AR1 and the second area AR2. The folding line FL may be disposed in the third area AR3.

The first area AR1 and the second area AR2 may be flat areas, and the third area AR3 may be an area that is folded (or bent) based on the folding line FL, and may have a curvature. For example, the first area AR1 and the second area AR2 may be referred to as a non-folding area, and the third area AR3 may be referred to as a folding area. In an embodiment, a width (e.g., length in the first direction DR1) of the third area AR3 may be relatively smaller than that of the first area AR1 and the second area AR2.

The first area AR1 and the second area AR2 may be in an in-folding state of about 90 degrees with respect to the second area AR2. In this embodiment, the first direction DR1 and the third direction DR3 may not be opposite to each other, and the first direction DR1 may be the same direction as the fourth direction DR4. For example, an angle between the first direction DR1 and the third direction DR3 may be less than 180 degrees, such as about 90 degrees. For example, a user may in-fold the display device 1000 as shown in FIG. 2 to use the display device 1000 as a foldable laptop computer. In an embodiment in which the display device 1000 is in the second state, the first area AR1 and the second area AR2 may face each other at an angle of less than 180 degrees and may not be disposed on a same plane.

The non-display area NDA is an area in which no image is displayed. For example, pixels may not be disposed in the non-display area NDA. In some embodiments, the non-display area NDA may be positioned at one side of the display area DA. However, embodiments of the present disclosure are not limited thereto. For example, in some embodiments the non-display area NDA may completely surround the display area DA or may be positioned at two or more sides of the display area DA. In addition, in some embodiments, a driving wire, a signal wire, a pad, and/or various dummy patterns may be disposed in the non-display area NDA.

In an embodiment, the display device 1000 may be implemented as a self-light emitting type of display panel such as an organic light emitting display panel. In this embodiment, a light emitting element of each pixel configuring the display panel may be configured of an organic light emitting diode, an inorganic light emitting diode, a quantum dot/well light emitting diode, and an ultra-small inorganic light emitting diode having a size ranging from a micro scale to a nano scale. However, embodiments of the present disclosure are not limited thereto. For example, in an embodiment, the display device 1000 may be implemented as a non-light emitting type of display panel such as a liquid crystal display panel.

Hereinafter, a stacked structure of a display device according to an embodiment will be described with reference to FIG. 3.

Figure 3:
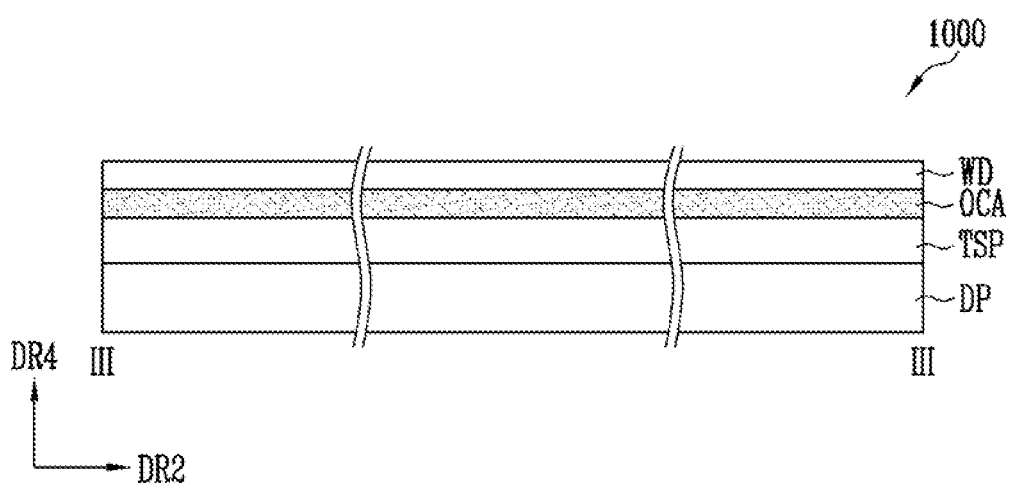
FIG. 3 illustrates a cross-sectional view taken along line III-Ill of FIG. 2 according to an embodiment of the present disclosure.

FIG. 3 illustrates a cross-sectional view taken along line III-III of FIG. 2.

FIG. 3 is a simplified (or exaggerated) diagram to explain a stacked relationship of elements configuring the display device 1000 according to an embodiment, and thus should be interpreted as explaining a relative disposition relationship between the elements, and a thickness or area of each element should not be interpreted as being limited to that illustrated in the drawings for convenience of explanation.

Referring to FIG. 3, the display device 1000 according to an embodiment may include a display panel DP, a sensing panel TSP, a transparent adhesive layer OCA, and a window WD (e.g., arranged in the fourth direction DR4).

The display panel DP may include a flexible substrate made of plastic material, and may display an image by using a pixel circuit and a light emitting diode that are disposed on the flexible substrate. For example, the light emitting element and the pixel circuit may be covered with a thin film encapsulation layer, and the thin film encapsulation layer may suppress characteristic degradation by sealing the light emitting element from an external environment including moisture and oxygen. However, embodiments of the present disclosure are not limited thereto. For example, in an embodiment, the display panel DP may not include a thin film encapsulation layer but may include an insulating layer made of an inorganic or organic material to cover the light emitting element and the pixel circuit. In addition, the display panel DP may further include a color filter and a light converting layer between the light emitting element and the insulating layer. In this embodiment, the display panel DP may include the first area AR1, the second area AR2, and the third area AR3 described with reference to FIG. 1 and FIG. 2.

The sensing panel TSP overlaps the display panel DP, and may sense a user's input or sense the fingerprint information of the user. In this embodiment, the user's input may include a direct input by the user's finger and an input by an electronic pen manipulated by the user. In some embodiments, after the sensing panel TSP and the display panel DP are separately manufactured, at least one area thereof may be disposed and/or combined to overlap each other. However, embodiments of the present disclosure are not limited thereto. For example, in an embodiment, the display panel DP and the sensing panel TSP may be integrally manufactured. For example, the sensing panel TSP may be directly formed on at least one substrate (e.g., an upper and/or lower substrate of a display panel, or a thin film encapsulation layer) forming the display panel DP or other insulating layers or various functional films (e.g., an optical layer or a passivation layer).

The sensing panel TSP is disposed on one surface of the display panel DP, and may include sensing electrodes. A detailed structure of the sensing panel TSP will be described with reference to FIG. 4, which will be described later.

The window WD may be positioned on an upper surface of the display device 1000. The window WD may protect the display panel DP and/or the sensing panel TSP from external impacts and scratches while transmitting an image of the display panel DP. In an embodiment, the window WD may include a transparent material that is relatively rigid and flexible. For example, in an embodiment, the window WP may include ultra thing glass (UTG) or colorless polyimide (CPI). However, embodiments of the present disclosure are not limited thereto.

The transparent adhesive layer OCA may be positioned between the window WD and the sensing panel TSP (e.g., in the fourth direction DR4) to bond the window WD and the sensing panel TSP. For example, the transparent adhesive layer OCA may be an optically transparent adhesive layer that fills a space between the window WD and the sensing panel TSP to prevent light loss and increase light transmittance. However, embodiments of the present disclosure are not limited thereto, and the transparent adhesive layer OCA may be replaced with various other adhesive materials.

Hereinafter, a structure of a sensing panel according to an embodiment will be described with reference to FIG. 4.

Figure 4:
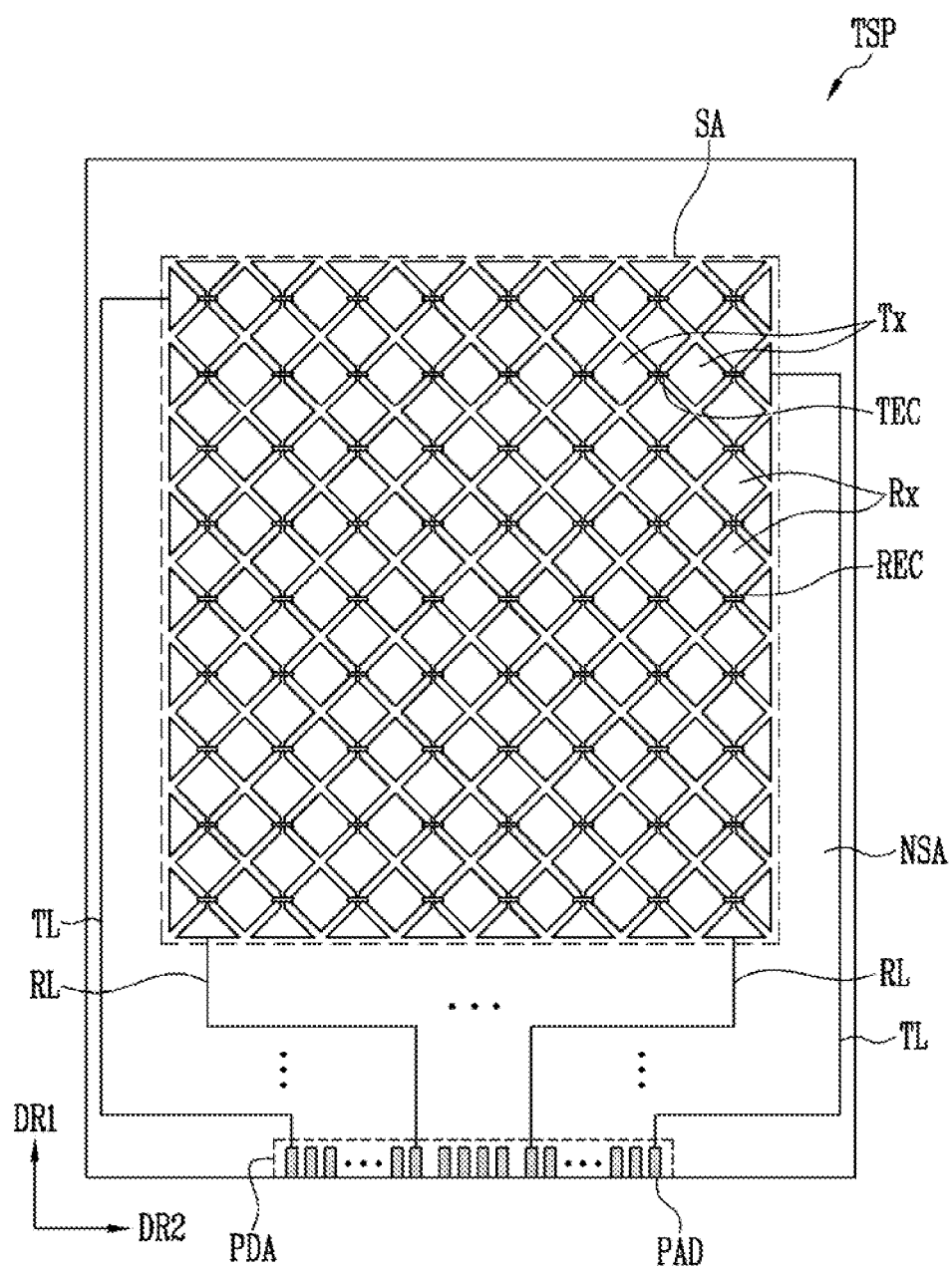
FIG. 4 illustrates a top plan view of a sensing panel according to an embodiment of the present disclosure.

FIG. 4 illustrates a schematic top plan view of a sensing panel according to an embodiment.

Referring to FIG. 4, the sensing panel TSP may include sensing electrodes, such as first and second sensing electrodes Tx and Rx, and may include a sensing area SA in which the sensing electrodes are disposed and a non-sensing area NSA surrounding the sensing area SA. The sensing electrodes Tx and Rx may be disposed in the sensing area SA. In an embodiment, the sensing area SA of FIG. 4 may be an area that may include (e.g., overlap in the fourth direction DR4) the display area DA of FIG. 1 and FIG. 2. In an embodiment, the sensing area SA may further include (e.g., overlap in the fourth direction DR4) a portion of the non-display area NDA, and the non-sensing area NSA may be an area excluding the sensing area SA from the non-display area NDA of FIG. 1 and FIG. 2.

The sensing electrodes may include a plurality of first sensing electrodes Tx and a plurality of second sensing electrodes Rx. The first sensing electrode Tx and the second sensing electrode Rx are separated from each other. In an embodiment, the first sensing electrode Tx may be a sensing input electrode, and the second sensing electrode Rx may be a sensing output electrode. In addition, the first sensing electrode Tx may be a sensing output electrode, and the second sensing electrode Rx may be a sensing input electrode.

The plurality of first sensing electrodes Tx and the plurality of second sensing electrodes Rx may be alternately dispersed so as not to overlap each other in the sensing area SA and may be disposed in a mesh shape. However, embodiments of the present disclosure are not limited thereto. In an embodiment, the plurality of first sensing electrodes Tx may be disposed in plurality along a column direction (e.g., the first direction DR1) and a row direction (e.g., the second direction DR2), respectively, and the plurality of second sensing electrodes Rx may be disposed in plurality along a column direction (e.g., the first direction DR1) and a row direction (e.g., the second direction DR2), respectively.

The plurality of first sensing electrodes Tx and the plurality of second sensing electrodes Rx may be positioned on the same layer in the sensing area SA, or may be positioned on different layers with an insulating layer interposed therebetween. In an embodiment, the first sensing electrode Tx and the second sensing electrode Rx may have a rhombus shape. However, embodiments of the present disclosure are not limited thereto, and the first sensing electrode Tx and the second sensing electrode Rx may have a polygonal shape such as a quadrangular or hexagonal shape, a circular shape, or an elliptical shape, and may be implemented in various shapes, such as having a protrusion to increase sensitivity of the sensing sensor.

At least some of the plurality of first sensing electrodes Tx arranged in the same row or column may be connected to or separated from each other inside or outside the sensing area SA. In addition, at least some of the plurality of second sensing electrodes Rx arranged in the same row or column may be connected to or separated from each other inside or outside the sensing area SA. For example, the plurality of first sensing electrodes Tx disposed in the same row may be connected to each other in the sensing area SA through a first sensing electrode connecting part TEC, and the plurality of second sensing electrodes Rx disposed in the same column may be connected to each other in the sensing area SA through a second sensing electrode connecting part REC.

In the non-sensing area NSA, a plurality of first signal wires TL and a plurality of second signal wires RL are respectively connected to the plurality of first sensing electrodes Tx and the plurality of second sensing electrodes Rx. In addition, the plurality of first signal wires TL and the plurality of second signal wires RL may be connected to a pad PAD of a pad area PDA.

In an embodiment, the sensing electrodes Tx and Rx may be driven by a self capacitance method or a mutual capacitance method according to a driving signal of a sensor driver.

In an embodiment, each of the plurality of first sensing electrodes Tx and the plurality of second sensing electrodes Rx may have conductivity by including at least one of a metallic material, a transparent conductive material, and various other conductive materials. For example, in an embodiment, the first sensing electrode Tx and the second sensing electrode Rx may include at least one of various metallic materials such as gold (Au), silver (Ag), aluminum (Al), molybdenum (Mo), chromium (Cr), titanium (Ti), nickel (Ni), neodymium (Nd), copper (Cu), and platinum (Pt), or an alloy thereof. However, embodiments of the present disclosure are not limited thereto. In this embodiment, the first sensing electrodes Tx and the second sensing electrodes Rx may be configured in a mesh form. In addition, in an embodiment, the first sensing electrodes Tx and the second sensing electrodes Rx may include at least one of various transparent conductive materials such as a silver nanowire (AgNW), an indium tin oxide (ITO), an indium zinc oxide (IZO), an indium gallium zinc oxide (IGZO), an antimony zinc oxide (AZO), an indium tin zinc oxide (ITZO), a zinc oxide (ZnO), a tin oxide ($SnO_2$), a carbon nano tube, and a graphene. However, embodiments of the present disclosure are not limited thereto. In addition, the first sensing electrodes Tx and the second sensing electrodes Rx may have conductivity by including at least one of various conductive materials. In addition, each of the first sensing electrodes Tx and the second sensing electrodes Rx may be made of a single layer or multilayer, and the cross-sectional structure thereof is not particularly limited.

Hereinafter, a structure of a display device according to an embodiment will be described with reference to FIG. 5 and FIG. 6.

Figure 5:
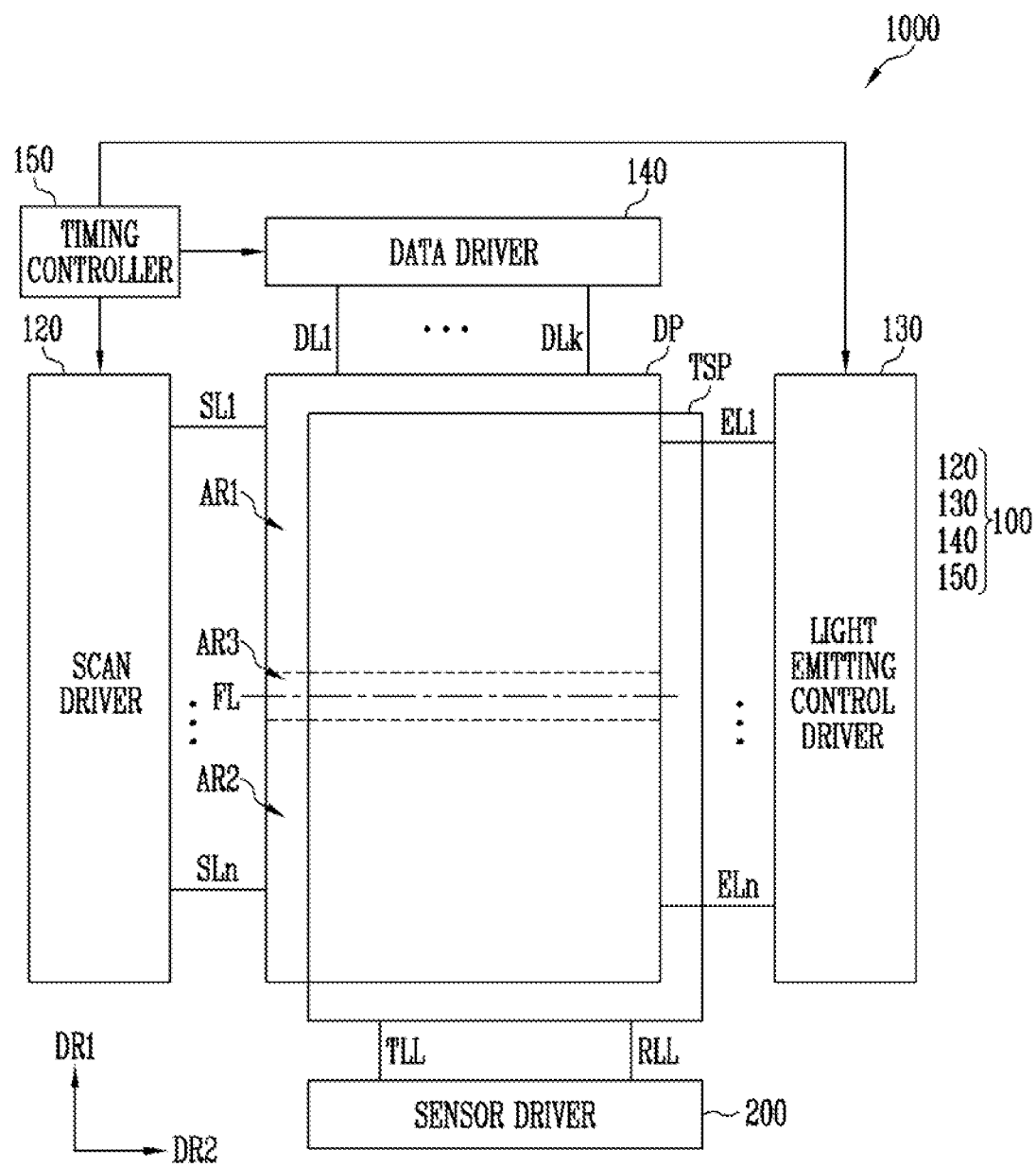
FIG. 5 illustrates a block diagram of a display device according to an embodiment of the present disclosure.
Figure 6:
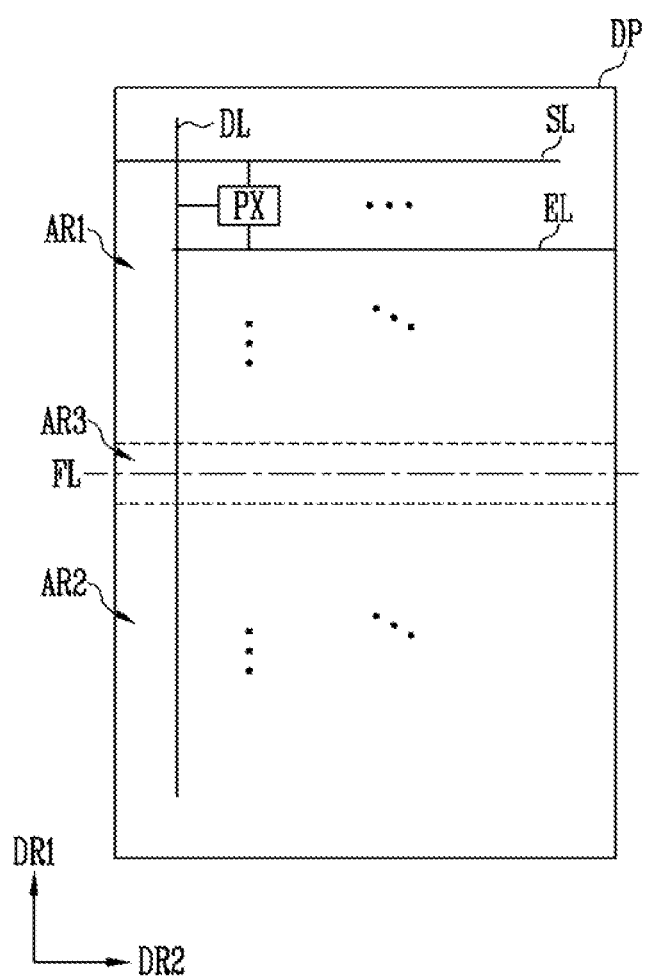
FIG. 6 illustrates a schematic top plan view of a display panel of FIG. 5 according to an embodiment of the present disclosure.

FIG. 5 illustrates a block diagram of a display device according to an embodiment, and FIG. 6 illustrates a schematic top plan view of a display panel of FIG. 5.

Referring to FIG. 5, the display device 1000 according to an embodiment may include the display panel DP, the sensing panel TSP, a panel driver 100, and a sensor driver 200.

Referring to FIG. 6, the display panel DP may include a plurality of pixels PX. Each of the plurality of pixels PX may be connected to a scan line SL, a data line DL, and a light emitting control line EL respectively corresponding thereto. Although only one pixel PX is shown in FIG. 6 and is positioned in the first area AR1 for convenience of illustration, the number of the pixels PX is not limited thereto and the pixels PX may be positioned in the second area AR2 and the third area AR3. For example, in an embodiment, the pixels PX may be entirely positioned to correspond to the display area DA (refer to FIG. 1) of the display panel DP.

The panel driver 100 is for driving the display panel DP, and a driving frequency may be set differently depending on a state of the display panel DP.

When the display panel DP is in a first state (e.g., the state shown in FIG. 1), the panel driver 100 may drive the first area AR1, the second area AR2, and the third area AR3 at a first driving frequency. In addition, when the display panel DP is in a second state (e.g., the state shown in FIG. 2), the panel driver 100 may drive at least a portion of the first area AR1 and the third area AR3 at the first driving frequency, and may drive the remaining portion of the second area AR2 and the third area AR3 at a second driving frequency lower than the first driving frequency. For example, the first driving frequency may correspond to a driving frequency for displaying at least one moving image, and the second driving frequency may correspond to a driving frequency for displaying at least one still image.

When the display panel DP is in the first state, the first area AR1, the second area AR2, and the third area AR3 may display at least one moving image. In addition, when the display panel DP is in the second state, the first area AR1 may display at least one moving image, and the second area AR2 may display at least one still image. In some embodiments, when the display panel DP is in the second state, at least a portion (e.g., a first portion) of the third area AR3 may display at least one moving image extending from the first area AR1 together with the first area AR1. For example, the first driving frequency for displaying at least one moving image may correspond to one of 60 Hz, 120 Hz, and 240 Hz, and the second driving frequency for displaying at least one still image may correspond to one of 10 Hz and 20 Hz. However embodiments of the present disclosure are not limited thereto, and the driving frequency may be variously changed.

In an embodiment, since the display device 1000 may set the driving frequency differently depending on the state of the display panel DP, unnecessary power consumption may be prevented. For example, when the display panel DP is in a folded state, as the display device 1000 drives a partial area at a relatively low frequency, power consumption may be reduced, unlike when the display panel DP is driven at the same frequency as in an unfolded state.

As shown in FIG. 5, in an embodiment, the panel driver 100 may include a scan driver 120, a light emitting control driver 130, a data driver 140, and a timing controller 150.

The scan driver 120 may supply a scan signal to the scan lines SL1 to SLn in response to a scan control signal, a clock signal, and the like received from the timing controller 150. In an embodiment, n is a natural number greater than or equal 2. In FIG. 5, the scan driver 120 is illustrated as being separated from the display panel DP. However, embodiments of the present disclosure are not limited thereto and the scan driver 120 may be mounted in the non-display area NDA (see FIG. 1 and FIG. 2) of the display panel DP.

The light emitting control driver 130 may supply a light emitting control signal to light emitting control lines EL1 to ELn in response to a light emitting stop signal or a clock signal received from the timing controller 150. In some embodiments, the light emitting control driver 130 may be omitted depending on a configuration of the pixel PX.

The data driver 140 may convert image data into a data voltage (or analog data signal) in response to a data control signal received from the timing controller 150, and may supply the data voltage to data lines DL1 to DLk.

The timing controller 150 may receive an input control signal and an input image signal from an image source such as an external graphic device. The timing controller 150 may generate image data suitable for an operating condition of the display panel DP, and provide it to the data driver 140. The timing controller 150 may provide control signals suitable for respective specifications to the scan driver 120, the light emitting control driver 130, the data driver 140, and the like based on the input control signal.

The sensing panel TSP may correspond to the sensing panel TSP described with reference to FIG. 3 and FIG. 4.

The sensor driver 200 may drive the sensing panel TSP. The sensor driver 200 may be electrically connected to the sensing panel TSP through signal lines RLL and TLL to receive sensing input data from the sensing panel TSP and to supply sensing output data.

In an embodiment, when the display panel DP is in the first state, the sensor driver 200 may drive the first area AR1, the second area AR2, and the third area AR3 in a first sensing mode or a second sensing mode for a predetermined time. For example, the first sensing mode may be a mode corresponding to a user's finger input, and the second sensing mode may be a mode corresponding to an electronic pen input. A detailed driving method of the sensor driver 200 will be described in detail with reference to FIG. 7 to FIG. 11, which will be described later.

In an embodiment, the first sensing mode includes a mode in which the first sensing electrodes Tx of the sensing panel TSP sense an external input using a self-capacitance method and/or a mutual capacitance method.

In an embodiment, the second sensing mode includes a series of processes in which when an electronic pen is close to (e.g., in physical proximity to) the first sensing electrodes Tx of the sensing panel TSP and an electronic pen position signal is sensed, the first sensing electrodes Tx receive input data, and sense coordinates, pressure, and the like of the electronic pen from capacitance generated between the first sensing electrodes Tx and the second sensing electrodes Rx. This sensing method may be referred to as an active electrostatic solution (AES) method. In addition, in some embodiments, the second sensing mode may include an electromagnetic resonance (EMR) method. The EMR method will be described with reference to FIG. 12 and FIG. 13 to be described later.

Hereinafter, a driving method of the sensor driver, when the display panel is in the first state or in the second state, will be described with reference to FIG. 7 to FIG. 11.

Figure 7:
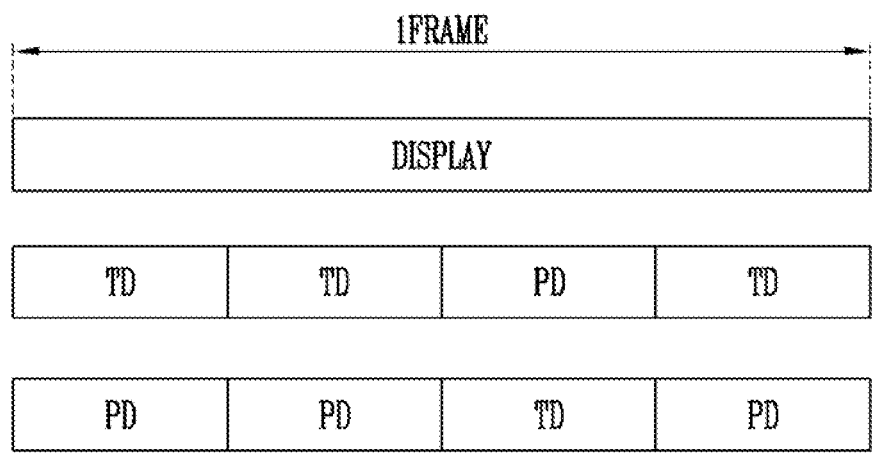
FIG. 7 illustrates a diagram for explaining a driving method of a sensor driver when a display panel is in a first state according to an embodiment of the present disclosure.
Figure 8:
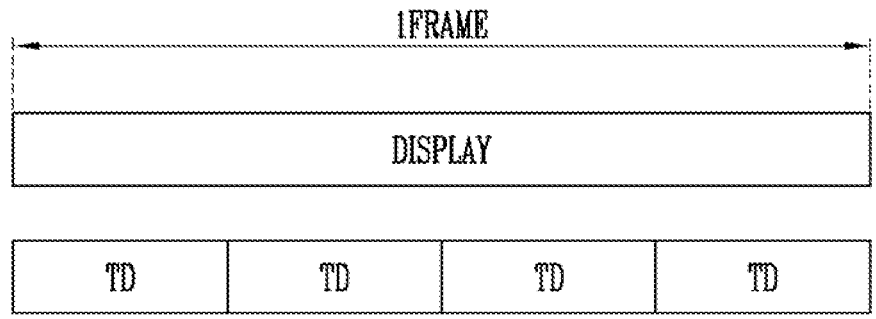
FIG. 8 and FIG. 9 illustrate diagrams for explaining a driving method of a sensor driver for a second area when a display panel is in a second state according to an embodiment of the present disclosure.
Figure 9:
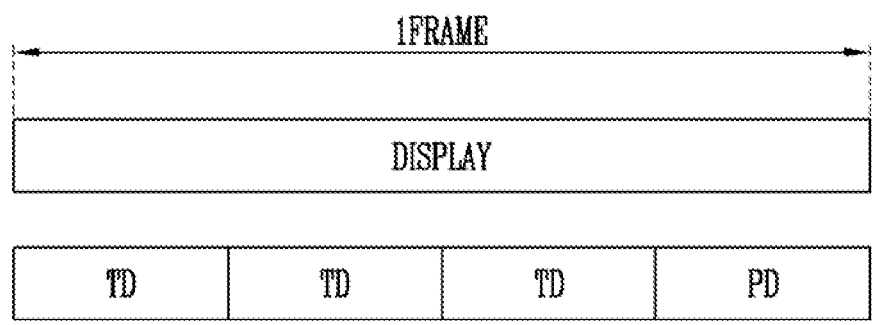
Figure 10:
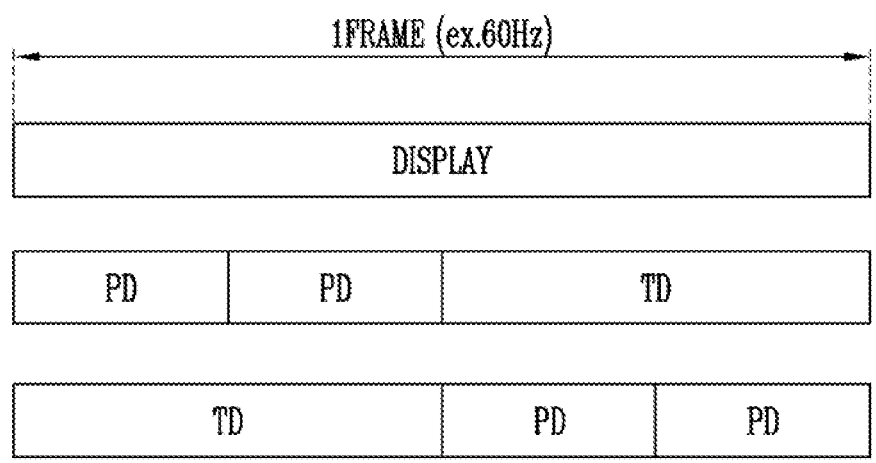
FIG. 10 illustrates a diagram for explaining a driving method of a sensor driver when a display panel is driven with a uniform frequency in a first state according to an embodiment of the present disclosure.
Figure 11:
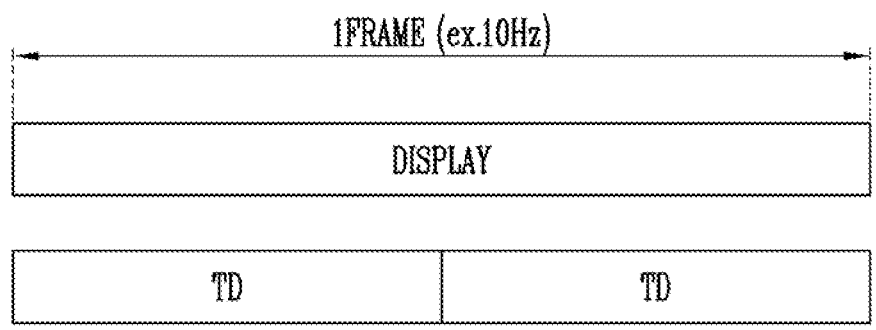
FIG. 11 illustrates a diagram for explaining a driving method of a sensor driver when a second area of a display panel is driven with a low frequency in a second state according to an embodiment of the present disclosure.

FIG. 7 illustrates a drawing for explaining a driving method of the sensor driver when the display panel according to an embodiment is in the first state, and FIG. 8 and FIG. 9 illustrate drawings for explaining a driving method of the sensor driver for a second area when the display panel according to an embodiment is in the second state. FIG. 10 illustrates a drawing for explaining a driving method of the sensor driver when the display panel according to an embodiment is driven with a uniform frequency in the first state, and FIG. 11 illustrates a drawing for explaining a driving method of the sensor driver when a second area of the display panel according to an embodiment is driven with a low frequency in the second state. Hereinafter, it will be described with reference to FIG. 1 to FIG. 6 together.

Referring to FIG. 1 and FIG. 7, when the display panel DP) is in the first state, the display panel DP may display at least one moving image in the first area AR1, the second area AR2, and the third area AR3 during a display period DISPLAY of one frame 1FRAME.

In an embodiment, the sensor driver 200 may sequentially perform touch driving TD by the first sensing mode; touch driving TD by the first sensing mode; electronic pen driving PD by the second sensing mode; and touch driving TD by the first sensing mode, in the first area AR1, the second area AR2, and the third area AR3.

In an embodiment, the sensor driver 200, in the first area AR1, the second area AR2, and the third area AR3, may sequentially perform electronic pen driving PD by the second sensing mode, electronic pen driving PD by the second sensing mode, touch driving TD by the first sensing mode, and electronic pen driving PD by the second sensing mode.

In an embodiment, each of the touch driving TD time and the electronic pen driving PD time included in the sensing driving sequence performed by the sensor driver 200 may be predetermined, and as the predetermined times elapse, the sensing panel TSP may be alternately and repeatedly driven by the touch driving TD and the electronic pen driving PD. For example, when the display panel DP is in the first state, the sensor driver 200 may sense data by various inputs by variously changing a driving method of the sensing panel TSP. The sensing driving mode of the sensor driver 200 shown in FIG. 7 is an example, and in some embodiments, the driving order (e.g., the sensing driving sequence) performed by the sensing driving mode which includes the first sensing mode and the second sensing mode may be variously changed.

Referring to FIG. 2, FIG. 8, and FIG. 9, when the display panel DP is in the second state, the display panel DP may display at least one moving image in the first area AR1 and may display at least one still image in the second area AR2, during a display period DISPLAY of one frame 1FRAME. A first portion of the third area AR3 may display at least one moving image together with the first area AR1, and a remaining second portion of the third area AR3 and the second area AR2 may display the at least one still image. In this embodiment, the first area AR1 and the first portion of the third area AR3 may be driven by the sensing driving method described with reference to FIG. 7.

The sensor driver 200 may drive the sensing electrodes Tx and Rx positioned in the first area AR1 and the third area AR3 in the first sensing mode or the second sensing mode.

On the other hand, since at least one still image is displayed in the second area AR2 and the second portion of the third area AR3, the display panel DP may be driven at a low frequency, and the sensor driver 200 may drive the sensing electrodes Tx and Rx positioned in the second area AR2 by a driving method corresponding to the image (e.g., at least one moving image or at least one still image) that is displayed by the display panel DP.

For example, as shown in FIG. 8, the sensor driver 200 may continuously perform the touch driving TD by the first sensing mode. In an embodiment, when the display panel DP is in the second state, since the second area AR2 may display at least one still image such as a keyboard image, the sensor driver 200 may drive the second area AR2 solely in the first sensing mode. For example, the sensor driver 200 may appropriately set the driving method of the sensing panel TSP to correspond to the image (e.g., at least one moving image or at least one still image) that is displayed on the display panel DP in the first to third areas AR1 to AR3.

In addition, as shown in FIG. 9, the sensor driver 200 may perform the touch driving TD by the first sensing mode and the electronic pen driving PD by the second sensing mode in the second area AR2 when the display panel DP is in the second state. For example, in an embodiment, the touch driving TD time may be longer than the electronic pen driving PD time. For example, in an embodiment, the sensor driver 200 may sequentially perform touch driving TD by the first sensing mode; touch driving TD by the first sensing mode; touch driving TD by the first sensing mode; and electronic pen driving PD by the second sensing mode. However, embodiments of the present disclosure are not limited thereto.

Referring to FIG. 1 and FIG. 10, when the display panel DP is in the first state, the display panel DP may display at least one moving image in the first area AR1, the second area AR2, and the third area AR3 during a display period DISPLAY of one frame 1FRAME. For example, the panel driver 100 may drive the display panel DP with a frequency of 60 Hz. However, embodiments of the present disclosure are not limited thereto. In addition, the sensor driver 200 may drive the sensing panel TSP in the first sensing mode at a frequency of 120 Hz, and may sequentially drive the sensing panel TSP in the second sensing mode at a frequency of 240 Hz. However, embodiments of the present disclosure are not limited thereto.

Although it is illustrated in FIG. 10 that the sensing panel TSP is sequentially driven by the touch driving TD by the first sensing mode, the electronic pen driving PD by the second sensing mode, and the electronic pen driving PD by the second sensing mode, or is sequentially driven by the electronic pen driving PD by the second sensing mode, the electronic pen driving PD by the second sensing mode, and the touch driving TD by the first sensing mode, embodiments of the present disclosure are not limited thereto. In some embodiments, the sensing panel TSP may be driven in various orders, including the first sensing mode and the second sensing mode.

Referring to FIG. 2, FIG. 9, and FIG. 11, when the display panel DP is in the second state, the display panel DP may display at least one moving image in the first area AR1 and a first portion of the third area AR3 and may display at least one still image in the second area AR2 and a second portion of the third area AR3, during a display period DISPLAY of one frame 1FRAME.

In this embodiment, the panel driver 100 may drive the display panel DP with a frequency of 10 Hz to display the at least one still image in the second area AR2. In addition, the sensor driver 200 may drive the sensing panel TSP in the first sensing mode with a frequency of 20 Hz.

Although it is illustrated in FIG. 11 that the sensing panel TSP is sequentially driven by the touch driving TD by the first sensing mode and the touch driving TD by the first sensing mode, embodiments of the present disclosure are not limited thereto. In some embodiments, the sensing panel TSP may be driven in various orders, including the first sensing mode and the second sensing mode.

Accordingly, since the display device according to the embodiment may differently set driving frequencies depending on a state of the display panel DP, it is possible to prevent unnecessary power consumption. For example, when the display panel DP is in a folded state, as the display device drives a partial area at a low frequency, power consumption may be reduced, unlike when the display panel DP is driven at the same frequency as in an unfolded state.

Hereinafter, a structure of sensing an electronic pen will be described with reference to FIG. 12 and FIG. 13.

Figure 12:
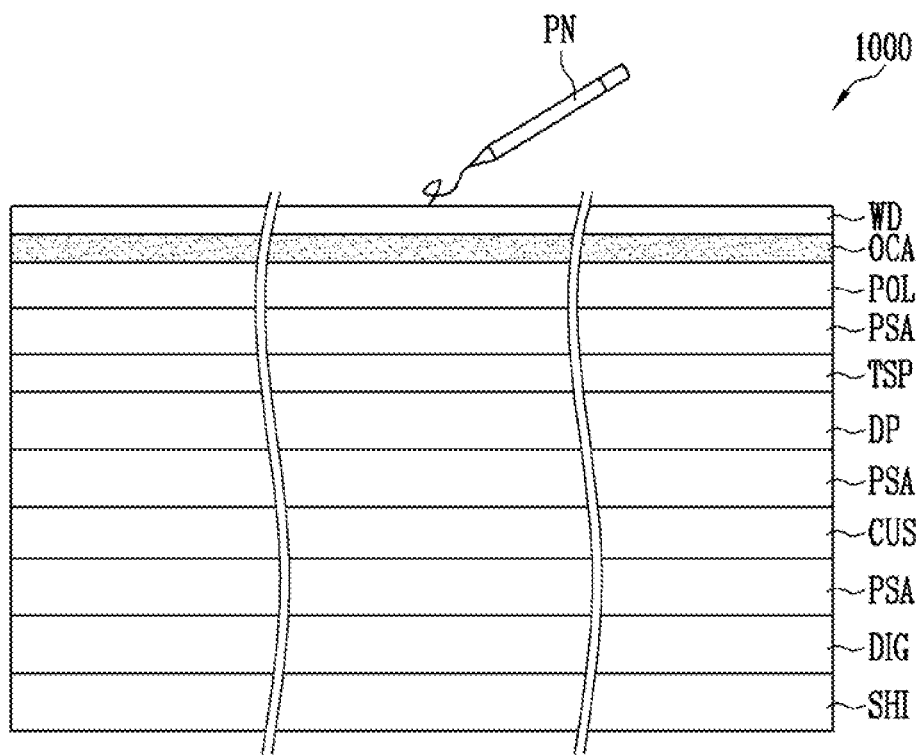
FIG. 12 illustrates a cross-sectional view of a stacked structure of a display device according to an embodiment of the present disclosure.
Figure 13:
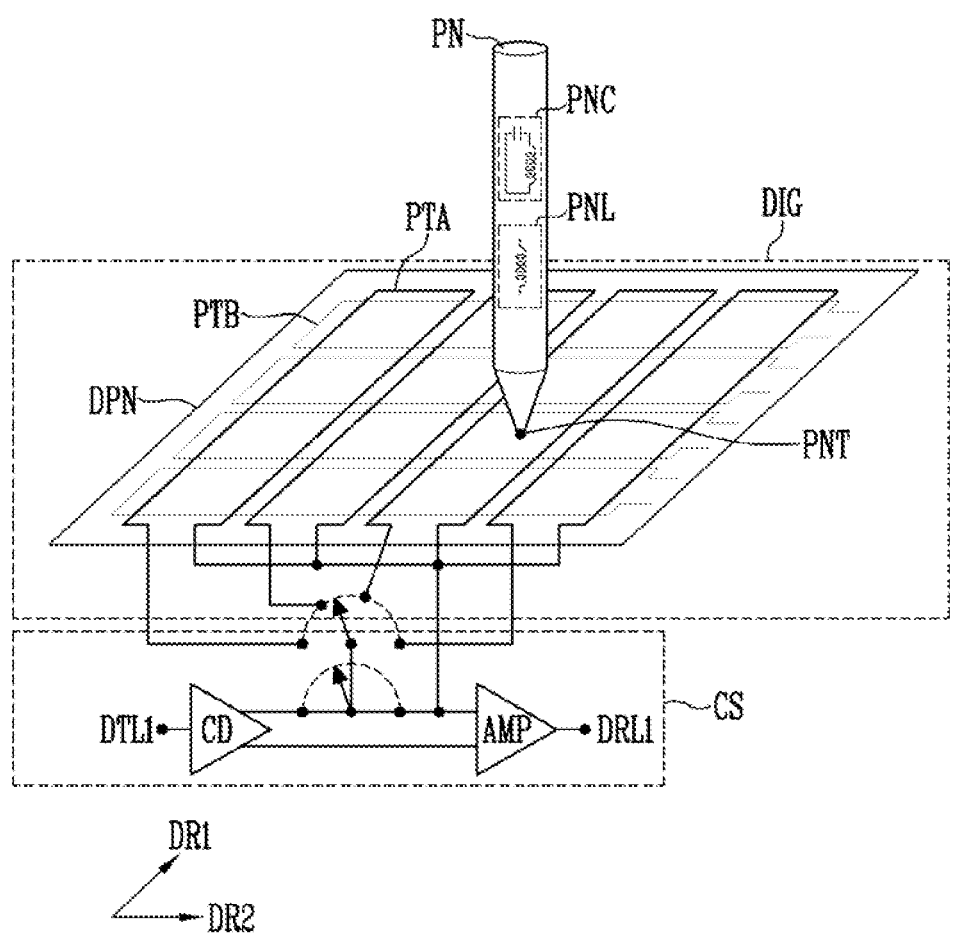
FIG. 13 illustrates a perspective view of a digitizer according to an embodiment and a connection set connected to the digitizer.

FIG. 12 illustrates a stacked structure of a display device according to an embodiment, and FIG. 13 illustrates a perspective view of a digitizer according to an embodiment and a connection set connected to the digitizer.

Referring to FIG. 12, the display device 1000 according to an embodiment may include a window WD, a transparent adhesive layer OCA, a polarizing plate POL, a sensing panel TSP, a display panel DP, an impact absorbing layer CUS, an adhesive layer PSA, a digitizer DIG, and a protective electrode SHI. The display device shown in FIG. 12 includes some of the same constituent elements as those of FIG. 3, and thus a duplicate description that overlaps that of FIG. 3 will be omitted for convenience of explanation.

The polarizing plate POL is positioned under the transparent adhesive layer OCA. The polarizing plate POL is a film that may pass or block vertically or horizontally polarized waves of incident light. In an embodiment, the polarizing plate POL may include a polyethylene terephthalate (PET) film or a tri-acetyl cellulose (TAC) film to prevent reflection of external light to increase visibility. However, embodiments of the present disclosure are not limited thereto.

The impact absorbing layer CUS is positioned on a lower surface of the display panel DP, and may be coupled to the display panel DP through the adhesive layer PSA. The impact absorbing layer CUS may reduce an impact from the outside and protect the display panel DP.

The digitizer DIG is positioned on a lower surface of the impact absorbing layer CUS, and may be coupled to the impact absorbing layer CUS through the adhesive layer PSA. The digitizer DIG may sense coordinates and pressure of an electronic pen PN. For example, the digitizer DIG may sense the coordinates, pressure, and the like of the electronic pen PN through the EMR method.

The protective electrode SHI is positioned on a lower surface of the digitizer DIG. The protective electrode SHI may shield unnecessary electromagnetic signals or electromagnetic noise, thereby permitting the digitizer DIG to smoothly achieve electromagnetic resonance with the electronic pen PN.

Referring to FIG. 13, the digitizer DIG may include conductive patterns PTA and PTB for receiving an input from the electronic pen PN based on electromagnetic induction. In an embodiment, the conductive patterns PTA and PTB may be predetermined patterns formed by patterning conductors on a flexible circuit board DPN or printing them on the flexible circuit board DPN with conductive ink. However, embodiments of the present disclosure are not limited thereto.

The conductive patterns PTA and PTB may generate a magnetic field by an input current supplied through a transmission line DTL1 of a connection set CS, and the generated magnetic field may be absorbed by the electronic pen PN. In addition, the electronic pen PN may re-emit the absorbed magnetic field, and the magnetic field emitted by the electronic pen PN may be absorbed by the conductive patterns PTA and PTB. In this embodiment, an input current may be supplied to the conductive patterns PTA and PTB through a current driver CD connected to the transmission line DTL1.

The electronic pen PN may include a resonance circuit PNC including a capacitor and an inductor, and may transmit a magnetic field to the conductive patterns PTA and PTB by the resonance circuit PNC.

Accordingly, when the electronic pen PN approaches the digitizer DIG, and a change in the magnetic field of the conductive patterns PTA and PTB occurs due to the interaction between the magnetic field outputted from the conductive patterns PTA and PTB and the resonance circuit PNC of the electronic pen PN, the change in the magnetic field of the conductive patterns PTA and PTB is outputted through a receiving line DRL1 of the connection set CS. The coordinates and pressure of the electronic pen PN may be detected through the conductive patterns PTA and PTB in which the change in the magnetic field is sensed. In an embodiment, the change in the magnetic field of the conductive patterns PTA and PTB may be amplified through an amplifier AMP of the connection set CS to be outputted to the receiving line DRL1.

Referring to FIG. 4, FIG. 5, FIG. 12, and FIG. 13, the sensor driver 200 may drive the sensing panel TSP described with reference to FIG. 4 in the first sensing mode, and may drive the digitizer DIG described with reference to FIG. 13 in the second sensing mode.

Accordingly, the driving method according to the second sensing mode described with reference to FIG. 7 to FIG. 11 may be applied to the sensing driving method using the digitizer DIG described with reference to FIG. 12 and FIG. 13.

While the present disclosure has been shown and described with reference to certain non-limiting embodiments thereof, it will be understood by those skilled in the art that various changes in forms and details may be made therein without departing from the spirit and scope of the present disclosure.

What is claimed is:

1. A display device comprising:
    a display panel including a display area having a first area and a second area for displaying an image, the display panel is configured to be positioned in a first state and a second state that is different from the first state;
    a sensing panel disposed on the display panel and including sensing electrodes;
    a panel driver driving the display panel; and
    a sensor driver driving the sensing panel, the sensor driver is configured to drive the sensing panel in a first sensing mode and a second sensing mode that is different from the first sensing mode, wherein,
    the panel driver drives the first area and the second area with a first driving frequency, when the display panel is in the first state,
    the panel driver drives the first area with the first driving frequency, and drives the second area with a second driving frequency that is lower than the first driving frequency, when the display panel is in the second state, and
    the sensor driver drives the first area and the second area in a sensing driving sequence that includes the first sensing mode and the second sensing mode each for a predetermined time, when the display panel is in the first state.

2. The display device of claim 1, wherein:
the first state is a state in which the first area and the second area are positioned on a same plane; and
the second state is a state in which the first area and the second area face each other at an angle of less than 180 degrees.

3. The display device of claim 2, wherein:
when the display panel is in the first state, the first area and the second area display at least one moving image.

4. The display device of claim 2, wherein:
when the display panel is in the second state, the first area displays at least one moving image and the second area displays at least one still image.

5. The display device of claim 4, wherein:
the display panel further includes a third area that is configured to be bent along a folding line that is positioned between the first area and the second area; and
at least a portion of the third area displays the at least one moving image.

6. The display device of claim 5, wherein:
the first sensing mode is a sensing mode corresponding to a user's finger input; and
the second sensing mode is a sensing mode corresponding to an electronic pen input.

7. The display device of claim 6, wherein:
the sensor driver drives the first area, the second area, and the third area in a sensing driving sequence that includes the first sensing mode and the second sensing mode each for a predetermined time, when the display panel is in the first state.

8. The display device of claim 7, wherein:
when the display panel is in the second state, the sensor driver drives the first area and a first portion of the third area in a sensing driving sequence that includes the first sensing mode and the second sensing mode each for a predetermined time and drives a second portion of the third area and the second area in the first sensing mode.

9. The display device of claim 6, wherein:
when the display panel is in the second state, the sensor driver drives the first area in a sensing driving sequence that includes the first sensing mode and the second sensing mode each for a predetermined time and drives the second area in the first sensing mode.

10. The display device of claim 6, wherein
when the display panel is in the second state, the sensor driver drives the first area in a sensing driving sequence that includes the first sensing mode and the second sensing mode each for a predetermined time and drives the second area in a sensing driving sequence that includes the first sensing mode and the second sensing mode each for a predetermined time.

11. A driving method of a display device that includes a display panel including a display area having a first area, a second area, and a third area for displaying an image, wherein the third area is configured to be bent along a folding line positioned between the first area and the second area, the display panel is configured to be positioned in a first state and a second state that is different from the first state based on bending of the third area; a panel driver driving the display panel; a sensing panel including sensing electrodes; and a sensor driver driving the sensing panel, the sensor driver is configured to drive the sensing panel in a first sensing mode and a second sensing mode that is different from the first sensing mode, the driving method comprising:
driving the first area and the second area with a first driving frequency by the panel driver, when the display panel is in the first state,
driving the first area with the first driving frequency and driving the second area with a second driving frequency lower than the first driving frequency by the panel driver, when the display panel is in a second state different from the first state, and
driving the first area, the second area, and the third area in a sensing driving sequence that includes the first sensing mode and the second sensing mode each for a predetermined time by the sensor driver when the display panel is in the first state.

12. The driving method of the display device of claim 11, comprising:
driving the first area and the second area to display at least one moving image by the panel driver, when the display panel is in the first state.

13. The driving method of the display device of claim 12, comprising:
driving the first area to display at least one moving image and driving the second area to display at least one still image by the panel driver, when the display panel is in the second state.

14. The driving method of the display device of claim 13, comprising:
driving at least a portion of the third area to display the at least one moving image by the panel driver, when the display panel is in the second state.

15. The driving method of the display device of claim 14, comprising:
driving the sensing panel in a sensing mode corresponding to a users finger input in the first sensing mode by the sensor driver; and
driving the sensing panel in a sensing mode corresponding to an electronic pen input in the second sensing mode by the sensor driver.

16. The driving method of the display device of claim 15, comprising:
driving the first area, the second area, and the third area in a sensing driving sequence of the first sensing mode, the second sensing mode, and the first sensing mode by the sensor driver, when the display panel is in the first state.

17. The driving method of the display device of claim 15, comprising:
driving the sensing panel in a sensing mode corresponding to an electronic pen input using a digitizer in the second sensing mode by the sensor driver.

18. The driving method of the display device of claim 15, comprising:
driving the first area in a sensing driving sequence that includes the first sensing mode and the second sensing mode each for a predetermined time and driving the second area in the first sensing mode by the sensor driver, when the display panel is in the second state.

19. The driving method of the display device of claim 15, comprising:
driving the first area in a sensing driving sequence that includes the first sensing mode and the second sensing mode each for a predetermined time and driving the second area in a sensing driving sequence that includes the first sensing mode and the second sensing mode each for a predetermined time by the sensor driver, when the display panel is in the second state.

20. The driving method of the display device of claim 11, wherein:
- the first state is a state in which the first area and the second area are positioned on a same plane; and
- the second state is a state in which the first area and the second area face each other at an angle of less than 180 degrees.

\* \* \* \* \*